(12) United States Patent
Carroll et al.

(10) Patent No.: US 12,552,039 B1
(45) Date of Patent: Feb. 17, 2026

(54) AUTOMATED CALIBRATION OF A MACHINE VISION SYSTEM

(71) Applicant: Amazon Technologies, Inc., Seattle, WA (US)

(72) Inventors: Tait Stephen Carroll, Seattle, WA (US); Alexander Volkov, Gardena, CA (US); Julius Klein, Gardena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 18/374,773

(22) Filed: Sep. 29, 2023

(51) Int. Cl.

| | |
|---|---|
| *B25J 9/16* | (2006.01) |
| *B25J 13/08* | (2006.01) |
| *G06T 7/70* | (2017.01) |
| *H04N 13/239* | (2018.01) |
| *H04N 13/246* | (2018.01) |
| *B65G 1/04* | (2006.01) |

(52) U.S. Cl.
CPC ........... *B25J 9/1692* (2013.01); *B25J 9/1697* (2013.01); *B25J 13/08* (2013.01); *G06T 7/70* (2017.01); *H04N 13/239* (2018.05); *H04N 13/246* (2018.05); *B65G 1/0421* (2013.01); *B65G 2203/0283* (2013.01)

(58) Field of Classification Search
CPC ...... B25J 9/1692; B25J 19/021; B25J 19/022; B25J 19/023; B25J 9/1697; B25J 13/08; G06T 7/70; G06T 7/521; H04N 13/246; H04N 13/239; G06Q 10/087; B65G 2203/0283

See application file for complete search history.

(56) References Cited

U.S. PATENT DOCUMENTS

| | | | |
|---|---|---|---|
| 6,301,763 B1 * | 10/2001 | Pryor | B23P 19/10 |
| | | | 29/702 |
| 8,280,547 B2 | 10/2012 | D'Andrea et al. | |
| 10,597,264 B1 * | 3/2020 | Muck | B25J 15/083 |
| 11,912,513 B1 * | 2/2024 | Polido | B25J 9/1697 |
| 12,062,013 B1 | 8/2024 | Zhu et al. | |
| 12,427,656 B2 | 9/2025 | Prechtl et al. | |

(Continued)

OTHER PUBLICATIONS

U.S. Appl. No. 18/208,793, Patent Application, "Stereo Structured Light Machine Vision System for Guidance of Automated Tote Exchange Equipment", filed Jun. 12, 2023.

*Primary Examiner* — Jason Holloway
*Assistant Examiner* — Benjamin J Brosh
(74) *Attorney, Agent, or Firm* — Kilpatrick Townsend & Stockton LLP

(57) ABSTRACT

Automated calibration of a machine vision system employs a calibration target assembly mountable to a robotic transfer assembly. An inventory management system includes a robotic transfer apparatus, a calibration target assembly, and a stereo vision assembly. The robotic transfer apparatus includes a support assembly and a transfer assembly. The support assembly is configured for repositioning the transfer assembly relative to the support assembly. The transfer assembly is rotatable relative to the support assembly. The calibration target assembly mountable to the transfer assembly and includes optical calibration targets. The stereo vision assembly is configured for imaging the optical calibration targets to generate calibration image data that is processed to generate calibration data for the machine vision system.

18 Claims, 11 Drawing Sheets

(56) References Cited

U.S. PATENT DOCUMENTS

| | | | |
|---|---|---|---|
| 2003/0065466 A1* | 4/2003 | Jackson | G01B 11/2755 |
| | | | 702/94 |
| 2012/0143427 A1 | 6/2012 | Hoffman et al. | |
| 2015/0291400 A1* | 10/2015 | Rintanen | B66C 13/00 |
| | | | 700/214 |
| 2017/0337508 A1* | 11/2017 | Bogolea | H04N 25/615 |
| 2018/0005035 A1 | 1/2018 | Bogolea et al. | |
| 2020/0339350 A1* | 10/2020 | Dooley | B65G 65/02 |
| 2020/0388053 A1* | 12/2020 | Wallack | H04N 13/282 |
| 2021/0003391 A1 | 1/2021 | Tsuji | |
| 2021/0037229 A1* | 2/2021 | Maykol Gomes Pinto | |
| | | | H04N 13/271 |
| 2021/0053230 A1* | 2/2021 | Mizoguchi | B25J 19/023 |
| 2021/0291376 A1* | 9/2021 | Wang | G01B 21/042 |
| 2021/0374836 A1 | 12/2021 | Bronicki et al. | |
| 2022/0147026 A1* | 5/2022 | Poelman | B25J 9/1653 |
| 2022/0343524 A1 | 10/2022 | Kyu et al. | |
| 2023/0159274 A1* | 5/2023 | Liu | B25J 5/007 |
| | | | 700/214 |
| 2023/0219237 A1* | 7/2023 | Galluzzo | B25J 13/006 |
| | | | 700/245 |
| 2023/0278221 A1* | 9/2023 | Simon | B25J 9/1692 |
| | | | 700/217 |
| 2024/0112459 A1 | 4/2024 | Hoso et al. | |
| 2024/0308081 A1 | 9/2024 | Ando | |

* cited by examiner

AUTOMATED CALIBRATION OF A MACHINE VISION SYSTEM

BACKGROUND

Inventory systems, such as those in warehouses, supply chain distribution centers, airport luggage systems, and custom-order manufacturing facilities, face significant challenges in storing inventory items. As inventory systems grow, the challenges of simultaneously completing a large number of packing, storing, and other inventory-related tasks become non-trivial. In inventory systems tasked with responding to large numbers of diverse inventory requests (in conjunction with inefficient utilization of system resources (e.g., space, equipment, labor)) can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
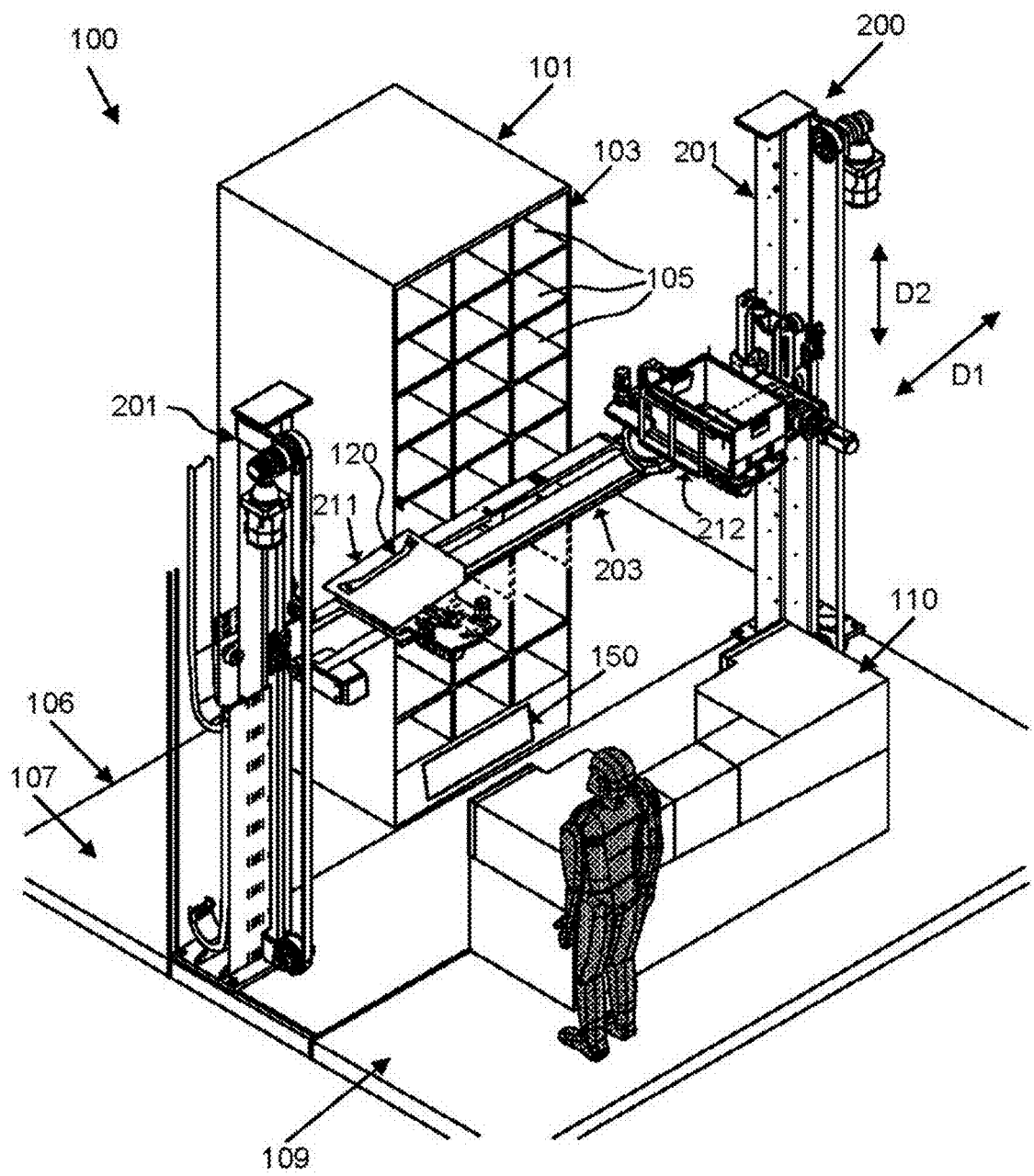
FIG. 1 illustrates example transfer apparatus of an example inventory system in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to automated calibration of machine vision aspects of inventory management systems. In many embodiments, a machine vision system is employed to control positioning and orientation of a transfer assembly of an inventory management system to ensure accurate transfer of an inventory tote by the transfer assembly between the transfer assembly and an inventory tote holder of the inventory management system. While the automated calibration of machine vision aspects of inventory management systems are described herein in the context of an inventory management system station configured for transferring inventory totes to and from inventory tote holders, the automated calibration approaches described herein can be employed to accomplish automated calibration of machine vision aspects of any suitable transfer assembly of an inventory management system.

Example embodiments described herein can be used to accomplish automated calibration an inventory system having multiple inventory holders and drive units for moving the inventory holders. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. Specifically, features herein can be used for calibration of machine vision aspects of an inventory system for detecting the position of objects relative to inventory holders so as to facilitate various functions of the inventory system. To this end, the inventory system can include stereo vision system for capturing localized images of a portion of the inventory holder and further determine three dimensional (3D) poses e.g., spatial positions of the inventory holder.

In accordance with an embodiment, an inventory station can include a stereo vision system for determining a 3D pose of the inventory holder. The inventory holder is typically transported by a mobile drive unit and positioned at an item transfer in a specified orientation. However, operating tolerances for the mobile drive unit and/or other factors may cause the orientation of the inventory holder to be slightly offset from the specified orientation with respect to an item transfer apparatus. This may affect the item transfer to or from the inventory holder when interacting with the transfer apparatus. For example, the item may be not properly inserted within the inventory holder, or it may be difficult to extract an item due to interference with a frame of the inventory holder. Hence, determining a three dimensional (3D) pose of the inventory holder within a 3D space can advantageously provide smooth and efficient interaction with the transfer apparatus 200 during an item transfer.

In accordance with an embodiment, the stereo vision system can include multiple cameras and lasers coordinated to capture localized information of the inventory holder for use during item transfer. Based on the captured information, the 3D pose of the inventory holder can be determined. For example, a first camera and a first laser can cooperatively capture a first image (e.g., a leftward image) localized to a first frame portion (e.g., a leftward portion) associated with a specified compartment of the inventory holder. A second camera and a second laser can cooperatively capture a second image (e.g., a rightward image) localized to a second frame portion (e.g., a rightward portion) associated with the specified compartment. One or more processors can be configured to determine the 3D pose of the inventory holder based on the first image and the second image.

In some embodiments, images can include one or more laser line profiles created by light of the lasers intersecting frame portions of the specified compartment. Based on a first laser line profile in the first image, a first location on a vertical portion and a second location on a horizontal portion of the first frame portion (e.g., the leftward portion) can be determined. Similarly, based on a second laser line profile, a third location on a horizontal portion and a fourth location on a vertical portion of the second frame portion (e.g., the rightward portion) can be determined. Based on the first location, the second location, the third location, and (optionally) the fourth location, the one or more processors can be configured to determine the 3D pose of the inventory holder.

Advantageously, the stereo vision system can be mounted on a transfer assembly or a cross beam of a transfer apparatus used for transferring items to/from the inventory holders. The transfer assembly can be positioned to a specified compartment of the inventory holder. This way, the stereo vision camera is also in a position to capture orientation-related information associated with the specified compartment. As such, extra movements of the transfer assembly may be avoided. Furthermore, the processor may be configured to determine orientation of the inventory holder based on few points extracted from an image captured by the cameras. Processing time to determine a 3D pose based on few points can be significantly faster compared to processing an entire image of an inventory holder. The 3D pose information can be used to accurately measure an arrival pose of the inventory holders. This eliminates the need for the inventory holder to arrive in a specific accurate pose which reduces cost of the inventory holders and mobile drive units used to transport the inventory holders, as well as increases the storage density efficiency of the inventory holders by allowing less clearance between the walls of the inventory holders and the item stored in the holder.

Referring now to the drawings, in which similar identifiers refer to similar elements, FIG. 1 illustrates a perspective view of an example of an inventory system 100, according to various embodiments. In the illustrated embodiment of FIG. 1, the inventory system 100 can include one or more inventory holders 101, a workstation 110, a transfer apparatus 200 within a workspace 106, and a stereo vision system 120 positioned on the transfer apparatus 200. In FIG. 1, one inventory holder 101, one transfer apparatus 200, and one vision system 120 are shown for illustration purposes without limiting the scope of the present disclosure. The inventory system 100 can move inventory items between one or more inventory holders 101 and the workstation 110. For example, the inventory system 100 can facilitate the entry, processing, and/or removal of inventory items from the inventory system 100 and the completion of other tasks involving the inventory items. In various embodiments, the workspace 106 can represent a portion of or all of the floor of a warehouse environment in which the inventory system 100 operates.

The inventory holder 101 of the inventory system 100 may operate within a first space 107 (e.g., moved by a mobile drive unit 150, for example), the operators can work in a second space 109 where the workstation 110 is located, and the transfer apparatus 200 can be operated in a third space between the first space 107 and the second space 109. The mobile drive unit 150 can transport the inventory holder 101 to a specified location in a specified orientation. However, operating tolerances for the mobile drive unit and/or other factors may cause the orientation of the inventory holder 101 to be slightly offset with respect to the transfer apparatus 200. Hence, determining a three dimensional (3D) pose of the inventory holder 101 within a 3D space can advantageously provide smooth and efficient interaction with the transfer apparatus 200 during an item transfer.

In many embodiments, the inventory holder 101 can include a plurality of compartments 105 defined by a frame 103. For example, the frame 103 can include vertical and horizontal frame elements spaced from each other and coupled to form rows and columns. The spacing between two adjacent horizontal frame elements and two adjacent vertical frame elements can define a compartment. Each of the compartments 105 has an opening to allow access to space within the compartment or items therein. Each opening of the compartment 105 allows insertion or removal of an item via the transfer apparatus 200. In some embodiments, for item transfer, the mobile drive unit 150 can position the inventory holder 101 in front of the transfer apparatus 200 and orient the inventory holder 101 such that each of the compartments 105 can be accessed by a transfer assembly 211, 212 of the transfer apparatus 200.

As shown, the compartments 105 can be arranged in rows and columns. The compartments 105 can have distinct locations and orientations (e.g., angular orientation) in the 3D space. For example, the compartments 105 can be at different heights or vertical locations and different horizontal locations. In many embodiments, a location in 3D space can be characterized by x, y, and z coordinates and/or rotational orientations about the x, y, and z axis. A 3D pose (e.g., orientation in a 3D space) of the inventory holder 101 can affect the location (e.g., the x, y, z coordinates) and orientation of each of the compartments 105. As a result, while inserting or extracting of an item to/from a compartment 105 the item may interfere along a depth (e.g., along the y-axis depicted) of the compartment 105. Determining the 3D pose of the inventory holder 101 or the compartment 105 can be advantageous for proper alignment between item transferring entities (e.g., transfer apparatus, item, inventory holder).

In many embodiments, the 3D pose can be determined based on localized information associated with a specified compartment 105 during an item transfer process therein. For example, the present disclosure provides a stereo vision system that can be positioned on a transfer apparatus and configured to determine a 3D pose of an inventory holder and/or localized information related to a compartment.

The transfer apparatus 200 includes an upright frame 201, a cross beam assembly 203, and a transfer assembly 211. The transfer assembly 211 can be configured for item transfer to/from an inventory holder. The transfer assembly 211 can be rotated and/or translated to align an item or item exchange mechanism with an opening of a specified compartment (e.g., 105) of an inventory holder. The transfer assembly 211 can be vertically aligned by moving the cross beam assembly 203 along the upright frame 201 or horizontally aligned by moving the transfer assembly 211 along the cross beam assembly 203. In addition or alternatively, a second transfer assembly 212, which can be same as the transfer assembly 211, may be provided. The cross beam assembly 203 of the transfer apparatus can support the transfer assembly 211. The cross beam assembly 203 may extend between the upright portions of the frame 201 to guide movement of the transfer assembly 211 in or along a first direction D1 (e.g., a horizontal direction or x-axis). The upright frame 201 may be arranged to guide and support movement of the cross beam assembly 203 in or along a second direction D2 (e.g., a vertical direction or z-axis). The transfer assembly 211 can rotate about an axis (e.g., z-axis) perpendicular to the cross beam assembly 203 and translate along the cross beam assembly 203 in the first direction D1. This rotation and translation movement can be performed independently or simultaneously. Additionally, the transfer assembly 211 can also include an extractor extendible in or along a third direction (e.g., y-direction) to extract or deliver items in or along a third direction (e.g., y-direction).

In many embodiments, the stereo vision system 120 can be provided on the transfer assembly 211 of the transfer apparatus 200. The stereo vision system 120 can be positioned to face a specified compartment 105 of the inventory holder 101, such as by moving the transfer assembly 211 along the x-axis and the z-axis. This way, the stereo vision system 120 can be localized to a particular portion (e.g., a specified compartment 105) of the inventory holder 101 to capture information local to that particular portion (e.g., the specified compartment 105). Based on the captured localized information, a 3D pose of the inventory holder 101 and/or the compartment 105 can be determined. In some embodiments, a 3D pose can be characterized by a level between two points of a frame portion, depth between two points of the same frame portion, an angular orientation of the frame portion, coordinate information of multiple points on the frame portion, or other geometric properties. Further, the 3D pose information can be used to accurately align the transfer assembly 211 with the inventory holder 101. Upon alignment, an item can be extracted or inserted in the inventory holder 101 with negligible interference with the inventory holder 101. Example components of the stereo vision system 120 and determining of the 3D pose is further discussed in detail below. Although the illustrated embodiment shows the stereo vision system 120 implemented on the transfer apparatus 200 operating in a Cartesian coordinate system, the stereo vision system 120 can be implemented on a different robotic transfer apparatus operating in a different coordinate system. Such robotic transfer apparatus can appropriately orient an item with their respective coordinate system based on the 3D pose information from the stereo vision system 120.

Figure 2:
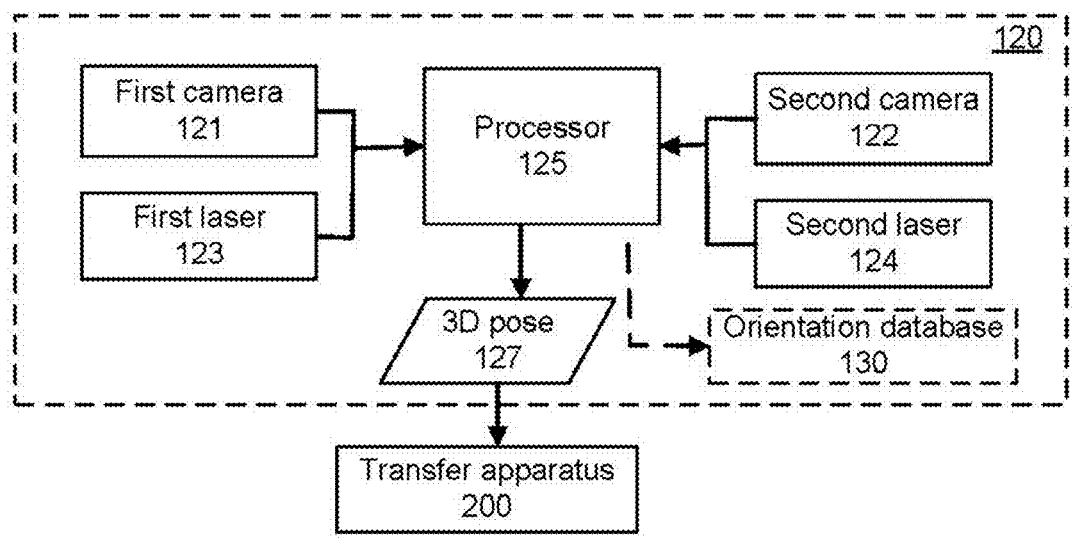
FIG. 2 is a block diagram of an example stereo vision system of the transfer apparatus of FIG. 1.

FIG. 2 is a block diagram showing examples of components that may be utilized in the stereo vision system 120 for determining a 3D pose of an inventory holder. The stereo vision system 120 can include multiple cameras, multiple lasers, and one or more processors in communication with the cameras and the lasers. Each camera can be coordinated with a laser to capture an image of localized portions of the inventory holder. For example, a localized portion can be a portion of the inventory holder intersected by light of the laser. Based on these local images, intersection points where the laser light intersects the portion of the inventory holder can be extracted. These intersection points can be used to determine, via the one or more processors, a 3D pose of the inventory holder.

As shown in FIG. 2, the stereo vision system 120 can include a first camera 121, a first laser 123, a second camera 122, a second laser 124, and a processor 125. Each of the cameras 121, 122 can be in communication (e.g., wired or wirelessly) with the processor 125. The processor 125 can be configured to determine a 3D pose 127 of an inventory holder based on the information (e.g., localized images) received from the cameras 121, 122. In addition or alternatively, the laser 123 and 124 can be in communication with the processor 125 and provide information related to the laser such as light intensity and laser orientation with respect to the inventory holder.

In many embodiments, the first camera 121, and the first laser 123 can cooperatively capture a first image localized to a first frame portion associated with a compartment (e.g., 105 in FIG. 1). For example, the first camera 121 can capture frame elements defining an opening of the specified compartment (e.g., a compartment 105 relative to which an item is to be extracted or inserted). Similarly, the second camera 122 and the second laser 124 can cooperatively capture a second image localized to a second frame portion associated with the same compartment. The cameras 121, 122 can be pre-oriented to capture different portions (e.g., a leftward portion and a rightward portion) of the same compartment of the inventory holder at the same time. For example, the cameras 121-122 comprises non-intersecting field of views. As such, images captured by the cameras 121-122 can be distinguishable from each other. In other words, the cameras 121-122 do not capture images of the same portions from different angles and use such angle and differences in images as variables to solve for location information. Further, the processor 125 may be configured to determine the 3D pose of the inventory holder based on the first image and the second image.

In many embodiments, the first laser 123 can be oriented to cause light to intersect with a vertical portion and a horizontal portion of the first frame portion (e.g., leftward) associated with an opening of the specified compartment of the inventory holder. The second laser 124 can be oriented to cause light to intersect with a horizontal portion and a vertical portion of the second frame portion (e.g., rightward) associated with the opening of the same specified compartment.

In many embodiments, the first image captured by the first camera 121 can include a first laser line profile associated with the light from the first laser 123 intersecting the first frame portion. The second image captured by the second camera 122 can include a second laser line profile associated with the light from the second laser 124 intersecting the second frame portion.

In many embodiments, the processor 125 can be configured to determine a first location on the vertical portion and a second location on the horizontal portion of the first frame portion based on the first laser line profile. Furthermore, the processor 125 can be configured to determine a third location on the horizontal portion and a fourth location on the vertical portion of the second frame portion based on the second laser line profile. For example, each of the first, second, third, and fourth locations can be characterized by coordinates (x, y, z) with respect to a reference plane (e.g., such as any of those described further below with reference to FIG. 10). Based on the first location, the second location, the third location, and the fourth location, the processor 125 can determine the 3D pose of the inventory holder.

In some embodiments, the processor 125 can be configured to compare dimensional values of the second location and the third location (e.g., which may both be along a horizontal portion of the compartment) to determine level information of the 3D pose of the inventory holder. In another example, the processor 125 can also be configured to compare dimensional values of the third location and the fourth location (e.g., which may both be along the second frame portion of the compartment) to determine a depth information of the 3D pose of the inventory holder. In addition or alternatively, the processor 125 can be further configured to determine the 3D pose based on the first location, the second location, and the third location. The fourth location can be used to determine a confidence score of the determined 3D pose.

In addition or alternatively, the stereo vision system 120 can include an orientation database 130. The orientation database can be pre-populated with localized information collected for inventory holders in different orientations. For example, the orientation database 130 can include geometric patterns, images, laser line intensities, locations of light intersecting frame portions, or other data associated with portions of the inventory holder in different orientations. The processor 125 can be configured to determine a 3D pose of the inventory holder based on pattern matching based on the first location, the second location, the third location, and the fourth location with patterns in the orientation database 130. The present disclosure is not limited to pattern matching and other methods may be employed. For example, the locations can be determined by isolating segments of the laser line profiles or detecting signal signature within the laser line profiles.

Figure 3:
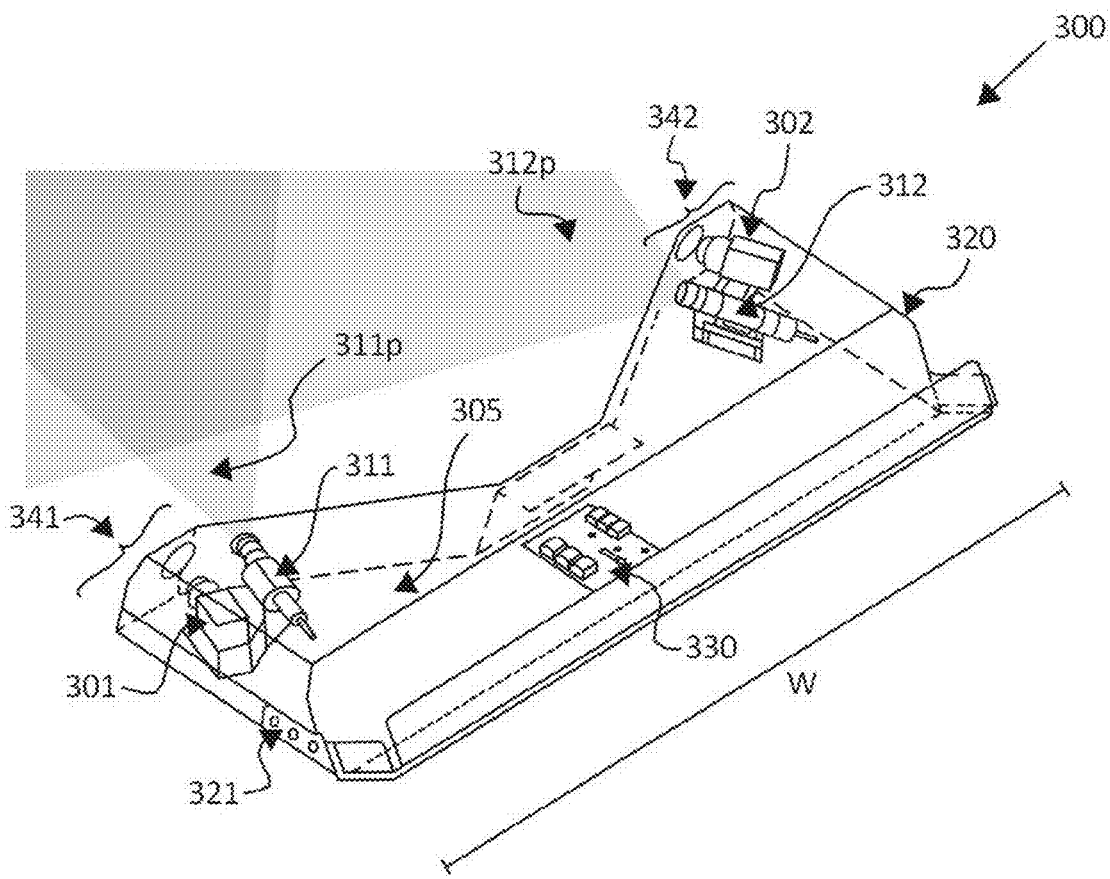
FIG. 3 illustrates an example configuration of the stereo vision system of FIG. 2.
Figure 4:
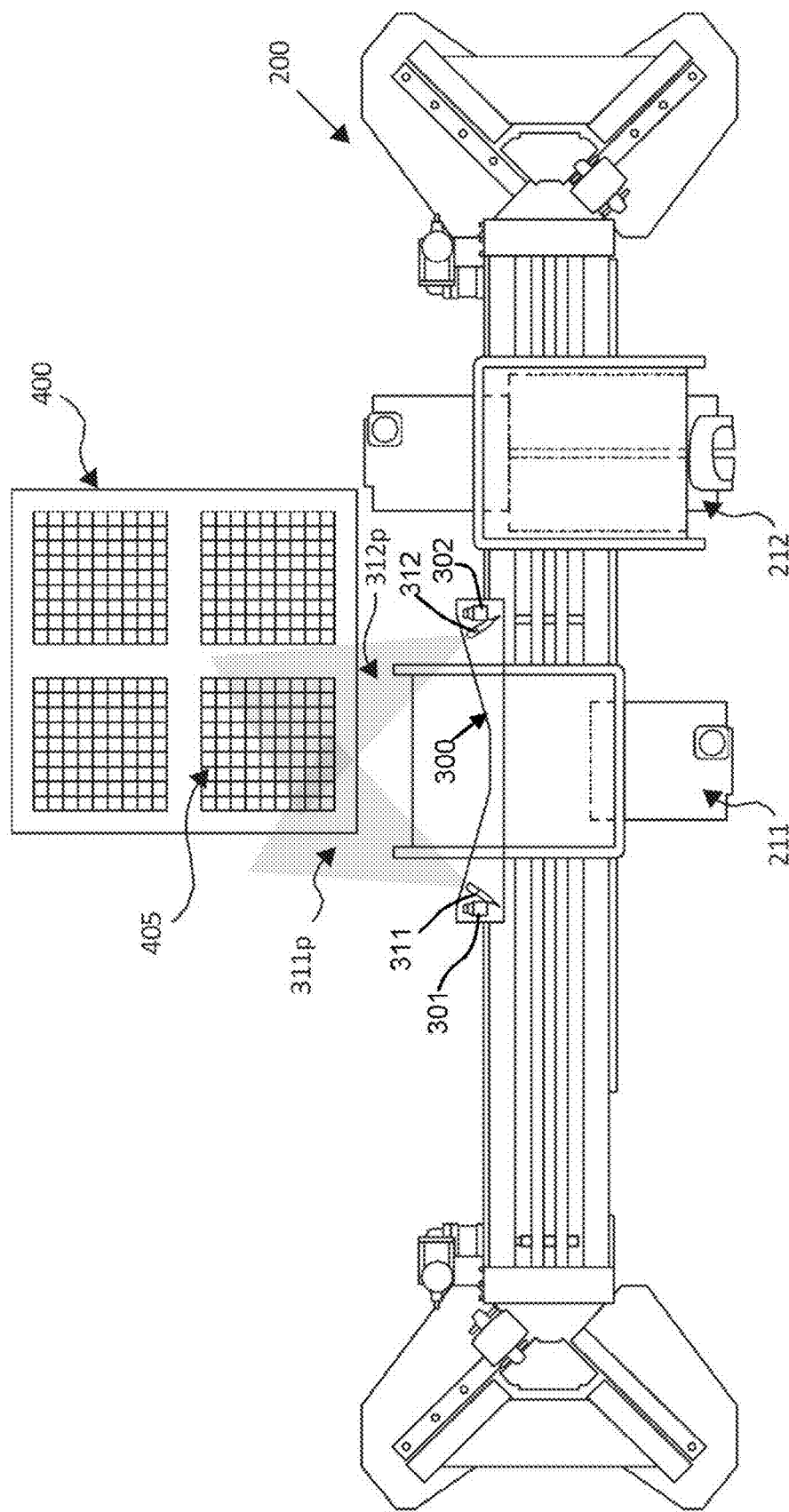
FIG. 4 illustrates a top view of the transfer apparatus of FIG. 1.
Figure 5:
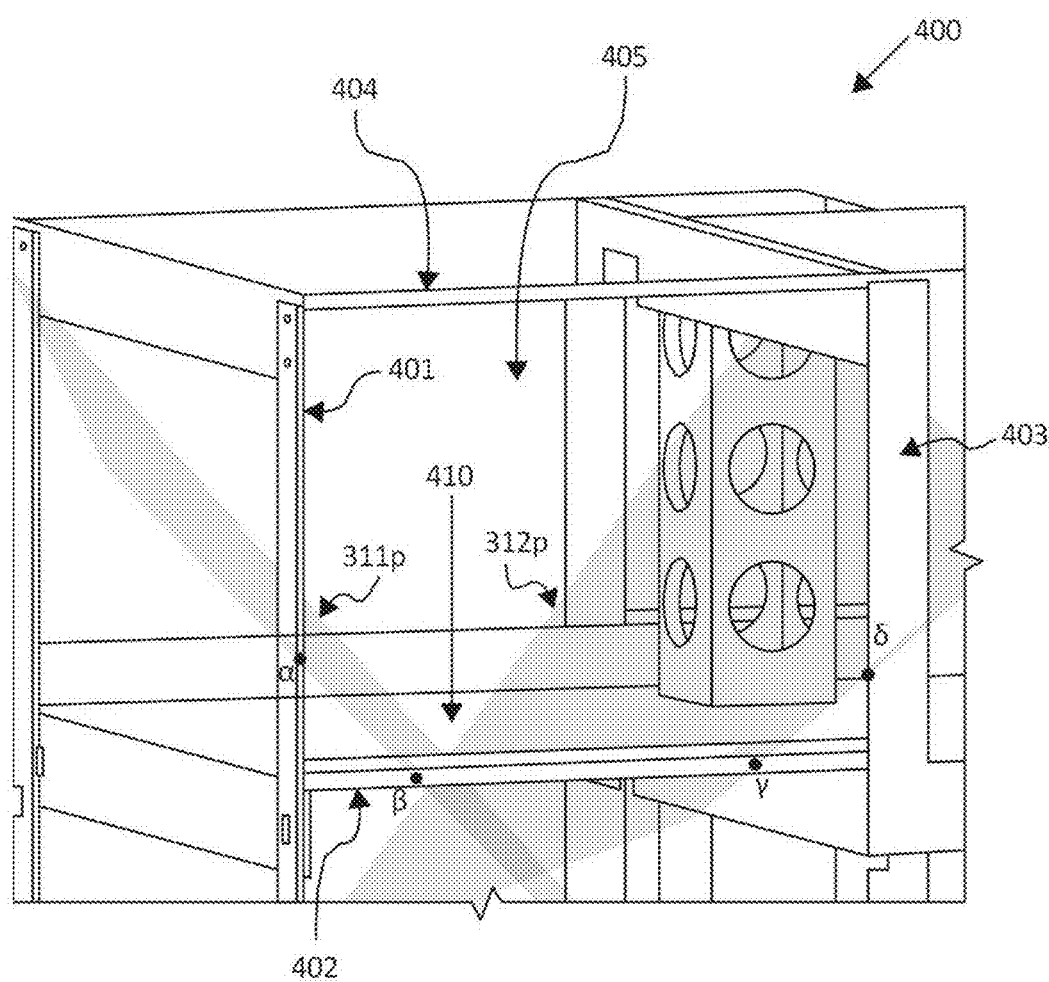
FIG. 5 illustrates example laser incident points on an inventory holder produced by the stereo vision system of FIG. 3.

FIG. 3 illustrates a stereo vision system 300, which can be an example implementation of the stereo vision system 120. FIG. 4 and FIG. 5 illustrate an example implementation of the stereo vision system 300 in an inventory system environment to determine a 3D pose of an inventory holder 400 (which can be similar to the inventory holder 100). Referring to FIG. 3, the stereo vision system 300 can include cameras and lasers installed on a platform 340. One or more processors may also be installed on the platform 340 or otherwise suitably situated for wired or wireless communication with the cameras and lasers. The platform 340 can have a width W configured to span across all or a portion of the transfer assembly 211 in FIG. 1 or other relevant portion of a transfer apparatus. The platform 340 can include a left end portion 341 and a right end portion 342 laterally spaced from the left end portion 341 along the width W. In some embodiment, the platform 340 can include a flat surface and/or may be shaped according to the geometry of other inventory system components (e.g., an inventory holder, and/or a transfer apparatus). In some embodiments, a cover 320 can be provided to cover components borne by the platform 340, such as the cameras, 301, 302, the lasers 311, 312, and/or the processor 330. The cover 320 can protect the components of the stereo vision system 300 from dust, water, or other pollutants that may be present in the inventory environment.

In the illustrated embodiment, the stereo vision system 300 can include a first camera 301, a second camera 302, a first laser 311, and a second laser 311. The first camera 301 and a first laser 302 can be disposed at the left end portion 341 of the platform 340. The second camera 302 and the second laser 312 can be disposed at the right end portion 432 of the platform 340. As illustrated, the second camera 302 can be laterally spaced from the first camera 301. The second camera 302 can be at a same level as the first camera 301. The second laser 312 can be laterally spaced from the first laser 311. The second laser 312 can be at a same level as the first laser 311. The first camera 301 and the first laser 311 can be in a first fixed orientation relative to the platform 340. The second camera 302 and the second laser 312 can be in a second fixed orientation relative to the platform 340. In some embodiments, each of the cameras 301, 302 and the lasers 311, 312 can be fixed relative to each other. When installed on the transfer apparatus (e.g., 200), the fixed orientation can indicate the cameras and the lasers are not movable relative to the platform 340 or other reference structure of the transfer apparatus.

In many embodiments, the first laser 311 can be configured to emit a first light plane 311$p$. The first light plane 311$p$ can have a triangular, sheet-like profile or other profile shapes. In some embodiments, the first laser 311 can emit light that appears as a line on a projected surface. Similarly, the second laser 312 can be configured to emit a second light plane 312$p$. The second light plane 312$p$ can have a triangular, sheet-like profile or other profile shapes. In some embodiments, the second laser 312 can emit light that appears as a line on a projected surface. The cameras 301 and 302 can respectively capture the line of light projected on the surface.

In some embodiments, calibration measurements to accurately determine the relative poses of the camera's and laser plane's orientations can be performed. After calibrating, for any given camera pixel there is a unique 3D point in space that the laser can reflect from to light up that pixel. Using the calibration data a 3D location can be calculated for all of the pixel that are lit up in an image captured by the camera.

Turning to FIG. 4 and FIG. 5, the first camera 301 and the first laser 311 can be localized (e.g., via the transfer apparatus 200) to capture a first image (e.g., a leftward image) of a leftward frame portion associated with a specified compartment 405 of the inventory holder 400. The right camera 302 and the right laser 312 can be localized to capture a second image (e.g., a rightward image) of a rightward frame portion of the frame associated with the specified compartment 405. The cameras 301, 302 may have intersecting field of views and the lasers 311, 312 may also emit light planes that are intersecting (at least partially). In this case, images can be captured by the cameras 301, 302 at various times. For example, sequentially turning on and off. For example, the first camera 301 and the first laser 311 turned on to capture a first image, followed by turning on the second camera 302 and the second laser 312 and turning off the first camera 301 and laser 311. As another example, an image processing method can be employed that can isolate the returns from only camera's corresponding laser. In other words, the cameras 301, 302 do not capture images of the same portions from different angles and use such angle and differences in images as variables to solve for location information.

For example, as shown in FIG. 5, the compartment 405 can be defined by frame elements 401, 402, 403, and 404, and a shelf 410 extending along a depth of the inventory holder. The frame elements 401-404 also define an opening of the compartment 405. The frame element 401 can be a leftward vertical frame portion, the frame element 402 can be a horizontal frame portion or a bottom frame portion, the frame element 403 can be a rightward vertical frame portion, and the frame element 404 can be another horizontal frame portion or a top frame portion. The stereo vision system 300 may be positioned to direct the first laser 311 such that the light plane 311$p$ intersects the element 401 and a leftward portion of the frame element 402 at intersection points $\alpha$ and $\beta$, respectively. Similarly, the second laser 312 may direct the light plane 312$p$ to intersect a rightward portion of the frame element 402 and the element 403 at intersection points $\gamma$ and $\delta$, respectively.

Automated Machine Vision Calibration

Figure 6:
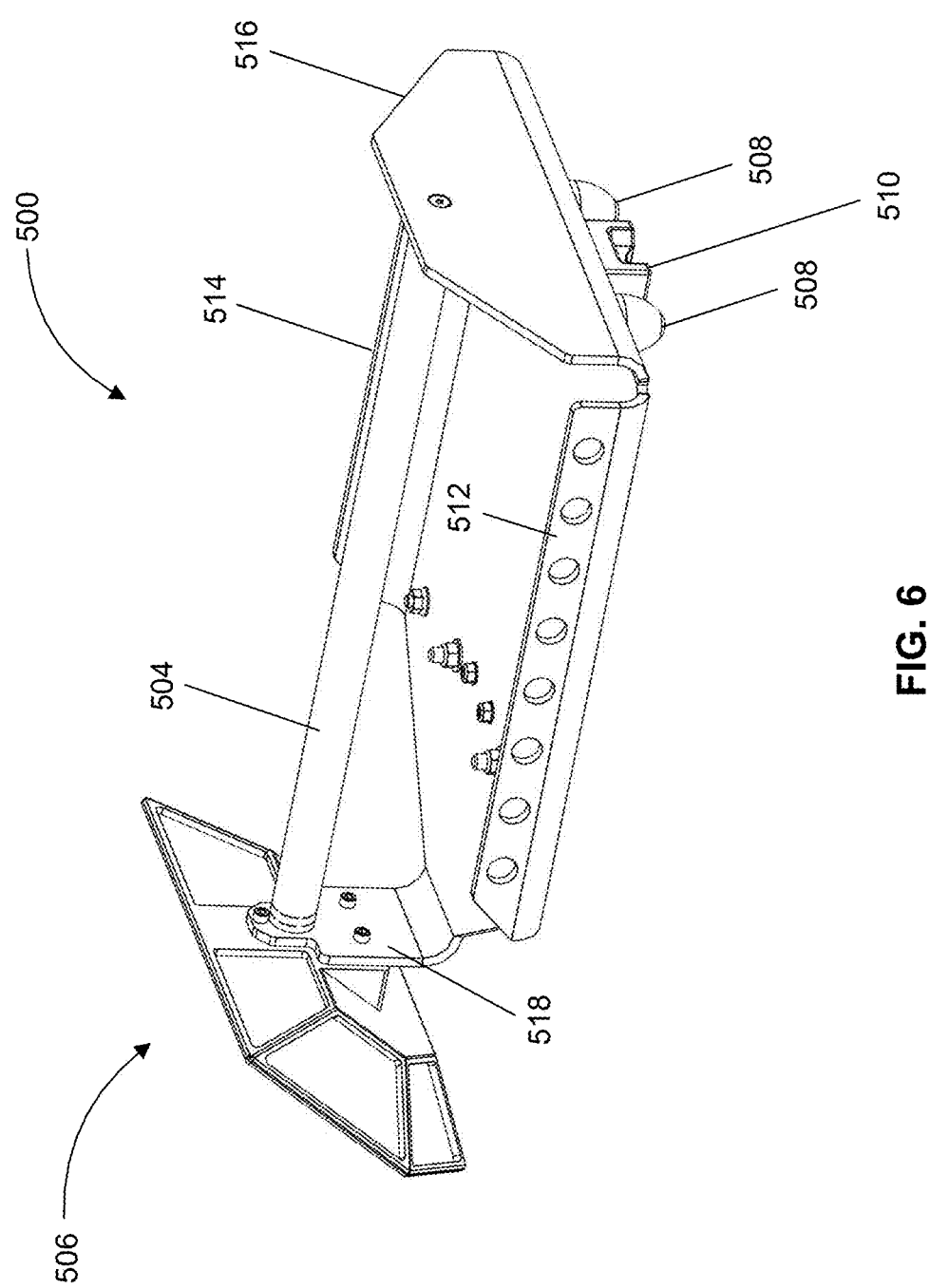
FIG. 6 and FIG. 7 illustrate an example calibration target assembly for calibrating the transfer apparatus of FIG. 1.
Figure 7:
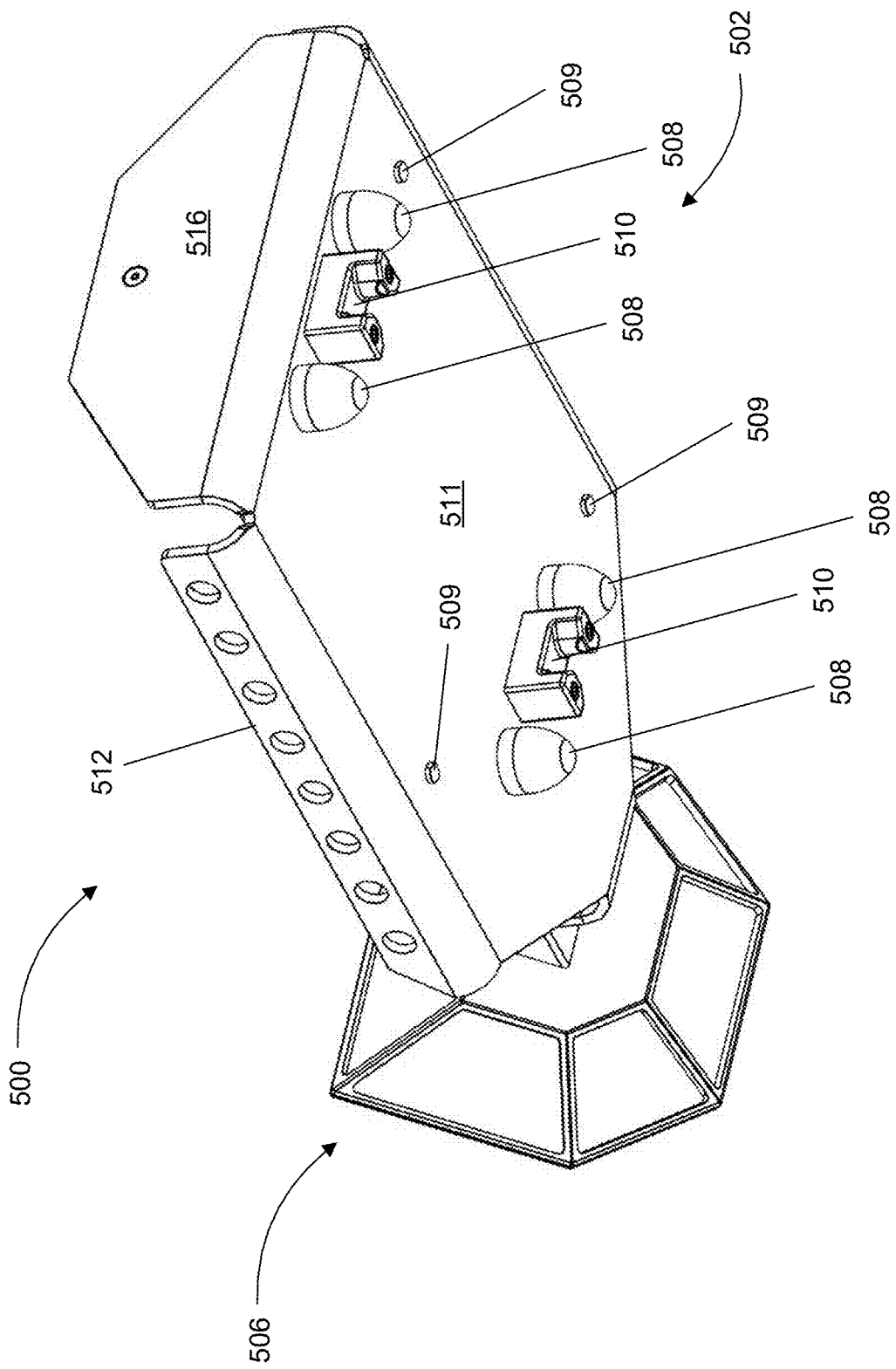
Figure 8:
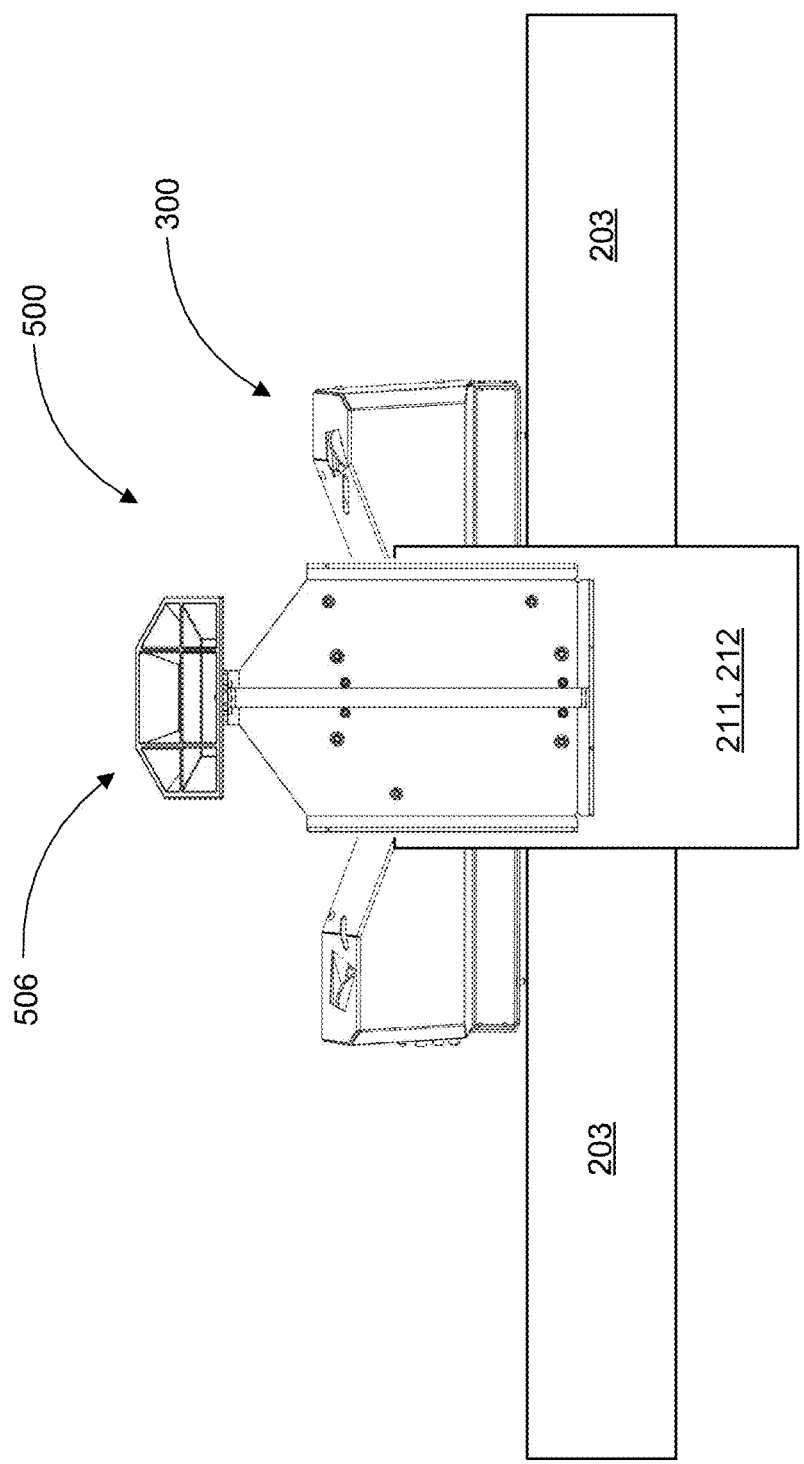
FIG. 8 illustrates the example calibration target assembly of FIG. 6 and FIG. 7 mounted to a transfer assembly of the transfer apparatus of FIG. 1.

FIG. 6 and FIG. 7 illustrate an example calibration target assembly 500 for calibrating the transfer apparatus 200. As illustrated in FIG. 8, the calibration target assembly 500 is configured to be mountable to either of the transfer assemblies 211, 212. The calibration target assembly 500 includes a base 502, a support rod 504, a calibration target 506, four base supports 508, and alignment members 509, 510. The base 502 is formed from a flat pattern and includes a base panel 511, side flanges 512, 514, a rear flange 516, and a front flange 518. The support rod 504 is attached to the rear flange 516 and extends from the rear flange 516 to the front flange 518. The calibration target 506 is attached to the support rod 504 by a fastener that extends through a fastener hole in the front flange 518, thereby securing the front flange 518 between the calibration target 506 and the support rod 504. The four base supports 508 are attached to and extend downward from the base panel 511. The alignment members 510 are attached to the base panel 511 in alignment with a longitudinal centerline of the base panel 511. The alignment members 510 are configured to receive and interface with a complementarily shaped alignment member of the transfer assembly 211, 212 to maintain rotational alignment between the calibration target assembly 500 and the transfer assembly 211, 212 when the calibration target assembly 500 is mounted to the transfer assembly 211, 212. The alignment members 509 interface with support surfaces of the transfer assembly 211, 212 to maintain alignment of the base panel 511 with the transfer assembly 211, 212. The combination of the alignment members 509, 510 control the overall pose of the calibration target assembly 500 relative to the transfer assembly 211, 212. FIG. 8 shows the transfer assembly 211, 212 in an extended configuration in which the calibration target 506 is disposed in an imaging position relative to the stereo vision system 300. The transfer assembly 211, 212 includes an extension actuator (e.g., a linear actuator) operable to control the extension of the calibration target assembly 500 relative to the transfer assembly 211, 212.

Figure 9:
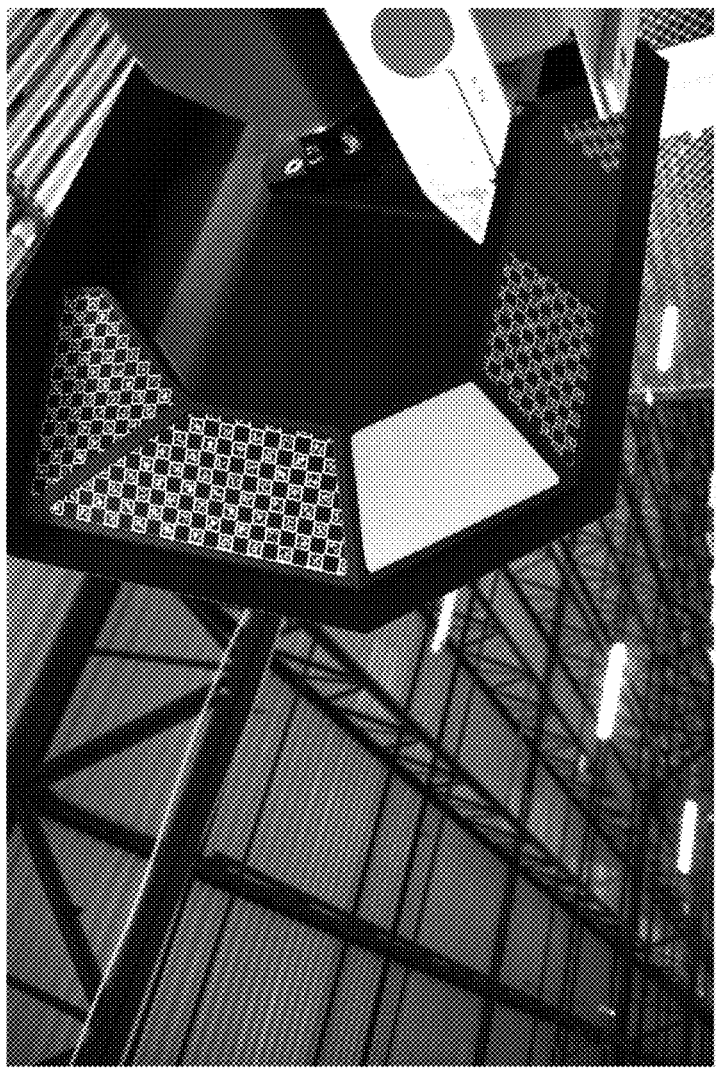
FIG. 9 shows an image of the example calibration target assembly of FIG. 6 and FIG. 7 captured by a left-side camera of the stereo vision system of FIG. 3.

FIG. 9 shows an image the calibration target 506 captured by the first camera 301 of the stereo vision system 300. Each side of the calibration target 506 includes three planar checker patterned calibration patterns and a planar white calibration panel. The first laser 311 is configured to project a planar first laser light pattern that is incident on the left-side planar white calibration panel. The first camera 301 and the second camera 302 images the calibration target 506 to generate calibration target image data that is analyzed by one or more processors to determine the three-dimensional (3D) pose of the transfer assembly 211, 212 (to which the calibration target assembly 500 is mounted) in a coordinate system of the stereo vision system 300, which is mounted to the cross beam assembly 203.

Figure 10:
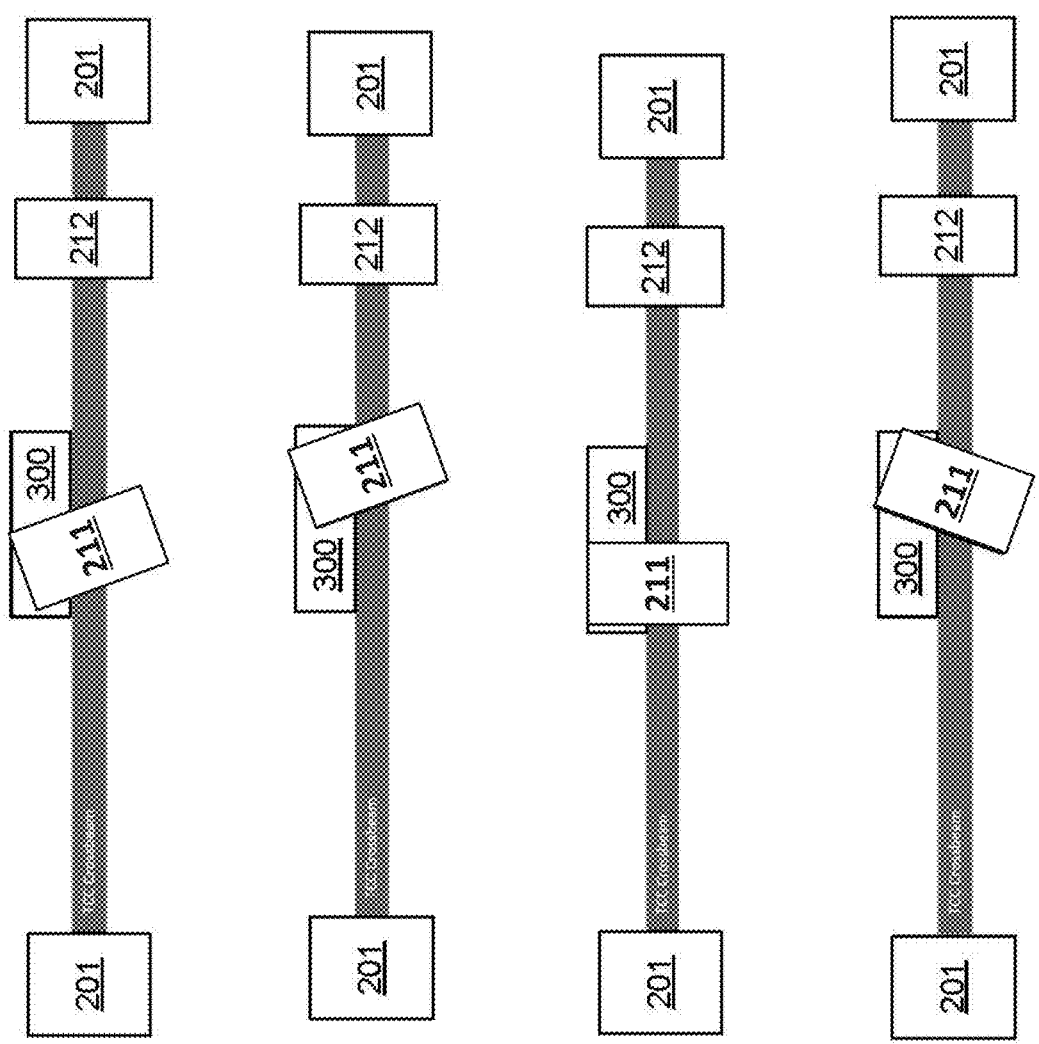
FIG. 10 illustrates the example commanded calibration three-dimensional (3D) poses of a transfer assembly of the transfer apparatus of FIG. 1.

In many embodiments, the 3D pose of the transfer assembly 211, 212 in the coordinate system of the stereo vision system 300 is measured using the calibration target assembly 500 for each of a predetermined sequence of commanded calibration poses of the transfer assembly 211, 212 relative to the cross beam assembly 203 to generate calibration data used to relate commanded poses of the transfer assembly 211, 212 (e.g., position along the cross-beam assembly 203, orientation around a vertical rotational axis) to the coordinate system of the stereo vision system 300 for use in positioning and orienting the transfer assembly 211, 212 during use. FIG. 10 illustrates an example set of commanded calibration 3D poses of the transfer assembly 211, 212 for use in generating the calibration data used to relate commanded poses of the transfer assembly 211, 212 to the coordinate system of the stereo vision system 300. Any suitable number of different commanded calibration poses can be used to ensure suitable accuracy of the resulting calibration data.

Figure 11:
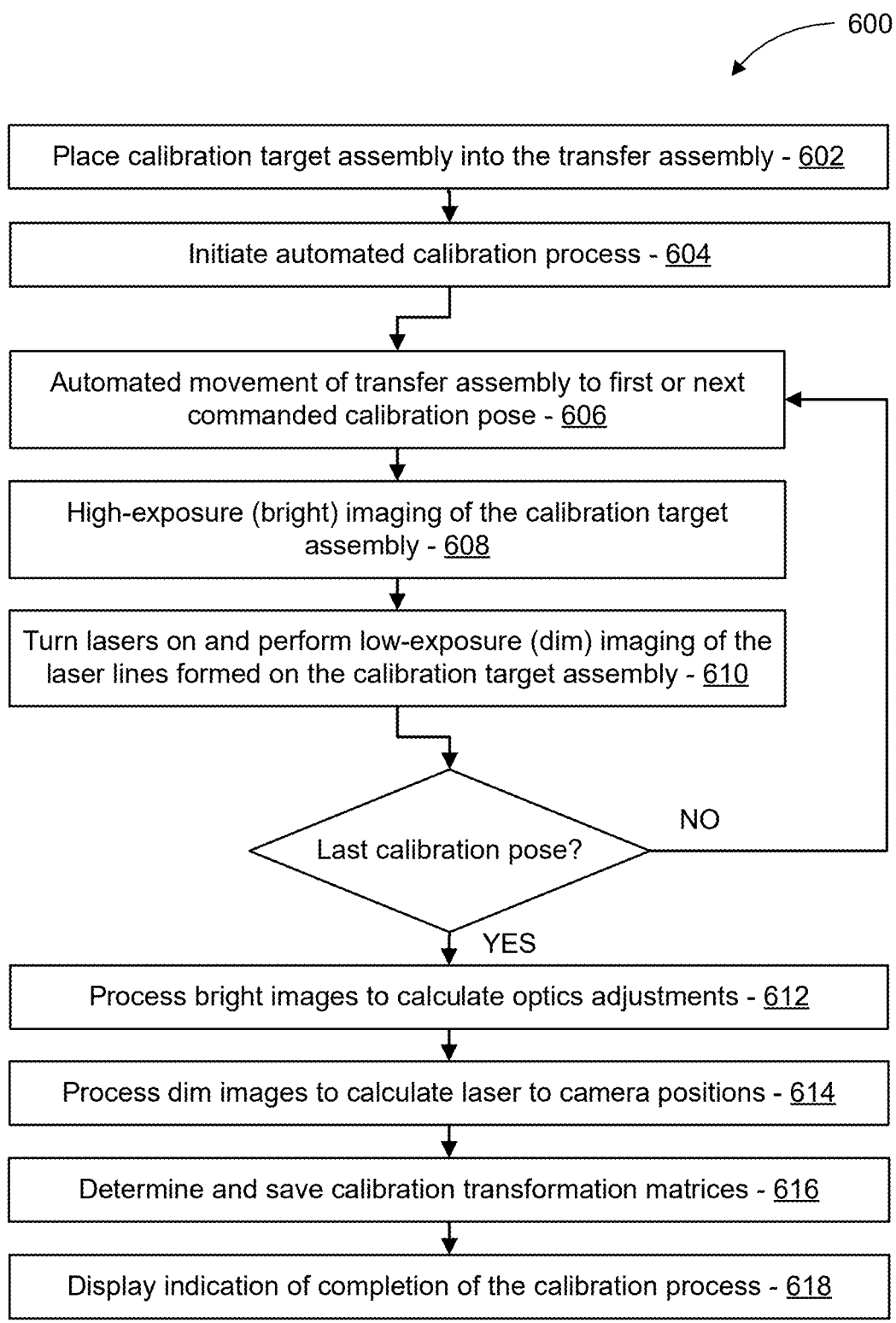
FIG. 11 is a simplified schematic diagram illustrating a method of calibrating machine vision related aspects of the transfer apparatus of FIG. 1.

FIG. 11 is a simplified schematic diagram illustrating a method 600 of calibrating machine vision related aspects of a transfer apparatus. Although the method 600 is described herein with reference to the transfer apparatus 200, the method 600 can be employed to calibrate machine vision related aspect of any suitable transfer apparatus. The method 600 is used to generate suitable calibration data (e.g., one or more transformation matrices) for use in relating positional coordinates of features measured by the stereo vision system 120 to a local coordinate system of the transfer assembly 211, 212 over operational ranges of positions of the transfer assembly 211, 212 along the cross beam assembly 203 and rotational orientations of the transfer assembly 211, 212 around a vertical rotational axis of the transfer assembly 211, 212.

The method 600 begins with placing a calibration target assembly 500 into each of the transfer assemblies 211, 212 (act 602). In many embodiments, the method 600 includes an automated calibration process that is initiated via a suitable input command into a control unit configured to control operation of the transfer apparatus 200. For example, in act 604, a calibration button on a control unit of the transfer apparatus 200 can be pressed to initiate the automated calibration process. In act 606, the transfer assembly 211 is moved to a commanded calibration 3D pose. In act 608, the stereo vision assembly 300 is used to take a high exposure (bright) image of the calibration target 506 to image the checker patterned calibration patterns. In act 610, the lasers 311, 312 of the stereo vision assembly 300 are turned on and the stereo vision assembly 300 is used to take a low exposure (dim) image of the laser lines formed on the planar white calibration panel by the lasers 311, 312. Acts 606, 608, 610 are repeated for each of a predetermined sequence of commanded calibration 3D poses for the transfer assembly 211. Acts 606, 608, 610 are then repeated for each calibration pose for the second transfer assembly 212. In act 612, the bright images are processed to calculate optics adjustments (e.g., lens de-warping, camera positions). In act 614, the dim images are processed to calculate laser to camera positions. In act 616, calibration transformation matrices are determined and saved to a calibration file. In some embodiments, the calibration transformation matrices define the relationship between positional coordinates of features measured by the stereo vision system 300 to a local coordinate system of the transfer assembly 211, 212 over operational ranges of positions of the transfer assembly 211, 212 along the cross beam assembly 203 and rotational orientations of the transfer assembly 211, 212 around a vertical rotational axis of the transfer assembly 211, 212. In act 618, the control unit of the transfer apparatus 200 displays an indication that the calibration process is complete.

Some or all of the method 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 12:
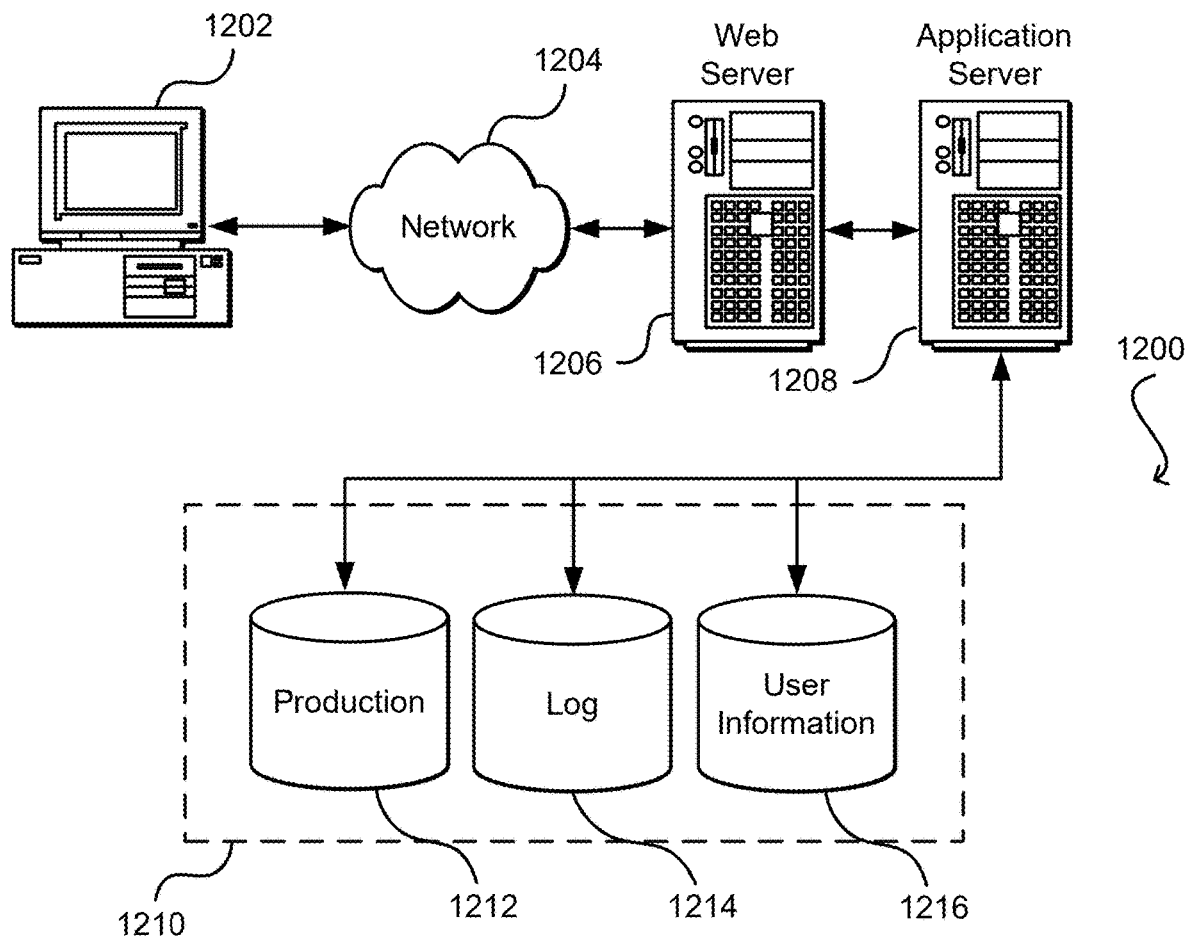
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, and flash cards.

Such devices also can include a computer-readable storage media reader, a communications device (e.g., a modem, a network card (wireless or wired)), an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system comprising:
   inventory totes, wherein each of the inventory totes is configured for storing inventory items;
   an inventory holder comprising compartments, wherein each of the compartments is configured for storing one of the inventory totes;
   a robotic transfer apparatus comprising a first column assembly, a second column assembly, a cross beam assembly, and a transfer assembly, wherein the cross beam assembly extends horizontally between and is coupled with the first column assembly and the second column assembly, wherein the first column assembly and the second column assembly are operable to reposition the cross beam assembly vertically relative to the first column assembly and the second column assembly, wherein the transfer assembly is mounted to the cross beam assembly, wherein the cross beam assembly is operable to reposition the transfer assembly laterally along the cross beam assembly, wherein the transfer assembly is rotatable around a vertical axis relative to the cross beam assembly, wherein the transfer assembly comprises a transfer assembly extension actuator operable to transfer the inventory totes into or out of the compartments;
   a calibration target assembly configured to be detachably mountable to the transfer assembly and comprising optical calibration targets, wherein the calibration target assembly is configured to interface with the transfer assembly to maintain a predetermined position and orientation of the calibration target assembly relative to the transfer assembly and accommodate extension of the calibration target assembly relative to the cross beam assembly via operation of the transfer assembly extension actuator;
   a stereo vision assembly mounted to the cross beam assembly and comprising a left camera and a right camera configured for imaging the optical calibration targets to generate calibration image data indicative of three-dimensional (3D) poses of the calibration target assembly relative to the stereo vision assembly, wherein each of the 3D poses of the calibration target assembly relative to the stereo vision assembly is measured for a respective commanded calibration 3D pose of the transfer assembly relative to the cross beam assembly; and
   at least one processor configured to:
      execute an automated sequence for generating the calibration image data, wherein the automated sequence comprises controlling the transfer assembly to reposition the calibration target assembly to each of the 3D poses of the calibration target assembly relative to the stereo vision assembly and controlling the stereo vision assembly to image the optical calibration targets in each of the 3D poses of the calibration target assembly relative to the stereo vision assembly to generate the calibration image data;
      process the calibration image data to generate calibration data for controlling operation of the robotic transfer apparatus based on image data generated by the stereo vision assembly; and
      control the robotic transfer apparatus, based on the calibration data, to transfer at least one of the inventory totes into or out of the inventory holder.

2. The inventory management system of claim 1, wherein:
   the stereo vision assembly further comprises a left laser and a right laser;
   the left laser is configured for emitting a left laser light pattern;
   the left camera is configured for imaging a first subset of the optical calibration targets to generate left camera image data indicative of locations of incidence of the left laser light pattern on the first subset of the optical calibration targets;
   the right laser is configured for emitting a right laser light pattern;
   the right camera is configured for imaging a second subset of the optical calibration targets to generate right camera image data indicative of locations of incidence of the right laser light pattern on the second subset of the optical calibration targets; and
   the calibration image data comprises the left camera image data and the right camera image data.

3. The inventory management system of claim 1, wherein
   the transfer assembly comprises one or more transfer assembly alignment members;
   each of the inventory totes comprises one or more tote alignment members configured to interface with the one or more transfer assembly alignment members to control orientation of the inventory tote relative to the transfer assembly; and
   the calibration target assembly comprises one or more calibration target assembly alignment features configured to interface with the one or more transfer assembly alignment members to control orientation of the calibration target assembly relative to the transfer assembly.

4. The inventory management system of claim 1, wherein the transfer assembly extension actuator is operable to reposition the calibration target assembly transverse to the cross beam assembly to place the optical calibration targets into a field of view of the stereo vision assembly.

5. A robotic transfer apparatus comprising:
   a first column assembly, a second column assembly, a cross beam assembly, and a transfer assembly, wherein the cross beam assembly extends horizontally between and is coupled with the first column assembly and the second column assembly, wherein the first column assembly and the second column assembly are operable to reposition the cross beam assembly vertically relative to the first column assembly and the second column assembly, wherein the transfer assembly is mounted to the cross beam assembly, wherein the cross beam assembly is operable to reposition the transfer assembly laterally along the cross beam assembly, wherein the transfer assembly is rotatable around a vertical axis relative to the cross beam assembly, wherein the transfer assembly comprises a transfer assembly extension actuator operable to reposition an item transverse to the cross beam assembly;
   a calibration target assembly configured to be detachably mountable to the transfer assembly and comprising optical calibration targets, wherein the calibration target assembly is configured to interface with the transfer assembly to maintain position and orientation of the calibration target assembly relative to the transfer assembly and accommodate extension of the calibration target assembly relative to the cross beam assembly via operation of an extension actuator of the transfer assembly;

a stereo vision assembly mounted to the cross beam assembly and comprising a left camera and a right camera configured for imaging the optical calibration targets to generate calibration image data indicative of three-dimensional (3D) poses of the calibration target assembly relative to the stereo vision assembly, wherein each of the 3D poses is measured for a respective commanded calibration 3D pose of the transfer assembly relative to the cross beam assembly, wherein the left camera is configured for imaging a first subset of the optical calibration targets to generate left camera image data, wherein the right camera is configured for imaging a second subset of the optical calibration targets to generate right camera image data, and wherein the calibration image data comprises the left camera image data and the right camera image data; and at least one processor configured to:

execute an automated sequence for generating the calibration image data, wherein the automated sequence comprises controlling the transfer assembly to reposition the calibration target assembly to each of the 3D poses of the calibration target assembly relative to the stereo vision assembly and controlling the stereo vision assembly to image the optical calibration targets in each of the 3D poses of the calibration target assembly relative to the stereo vision assembly to generate the calibration image data;

process the calibration image data to generate calibration data for use in controlling operation of the robotic transfer apparatus based on image data generated by the stereo vision assembly; and control the transfer assembly, based on the calibration data, to transfer the item between a first location and a second location.

6. The robotic transfer apparatus of claim 5, wherein:
the stereo vision assembly comprises a left laser and a right laser;
the left laser is configured for emitting a left laser light pattern incident on the first subset of the optical calibration targets; and
the right laser is configured for emitting a right laser light pattern incident on the second subset of the optical calibration targets.

7. The robotic transfer apparatus of claim 6, wherein each of the first subset of the optical calibration targets and the second subset of the optical calibration targets comprises two planar targets that are not coplanar.

8. The robotic transfer apparatus of claim 6, wherein each of the first subset of the optical calibration targets and the second subset of the optical calibration targets comprises three planar targets that are not coplanar.

9. The robotic transfer apparatus of claim 5, wherein
the transfer assembly comprises one or more transfer assembly alignment members; and
the calibration target assembly comprises one or more calibration target assembly alignment features configured to interface with the one or more transfer assembly alignment members to control orientation of the calibration target assembly relative to the transfer assembly.

10. The robotic transfer apparatus of claim 5, wherein the transfer assembly is configured for repositioning the calibration target assembly relative to the cross beam assembly to place the optical calibration targets into a field of view of the stereo vision assembly.

11. The robotic transfer apparatus of claim 5, wherein at least one of the optical calibration targets comprises a checkerboard calibration pattern.

12. The robotic transfer apparatus of claim 5, wherein:
the robotic transfer apparatus is operable to translate the transfer assembly relative to the cross beam assembly;
the transfer assembly is rotatable relative to the cross beam assembly; and
the transfer assembly comprises a transfer assembly extension actuator operable to reposition the calibration target assembly relative to the cross beam assembly.

13. A method of generating calibration data for a robotic transfer apparatus, the method comprising:
mounting a calibration target assembly to a transfer assembly coupled with a cross beam assembly of a robotic transfer apparatus, wherein the calibration target assembly comprises optical calibration targets, wherein the transfer assembly is configured for transferring an item from a first location to a second location, wherein the robotic transfer apparatus comprises a first column assembly, a second column assembly, the cross beam assembly, and a transfer assembly, wherein the cross beam assembly extends horizontally between and is coupled with the first column assembly and the second column assembly, wherein the first column assembly and the second column assembly are operable to reposition the cross beam assembly vertically relative to the first column assembly and the second column assembly, wherein the transfer assembly is mounted to the cross beam assembly, wherein the cross beam assembly is operable to reposition the transfer assembly laterally along the cross beam assembly, wherein the transfer assembly is rotatable around a vertical axis relative to the cross beam assembly, wherein the transfer assembly comprises a transfer assembly extension actuator operable to reposition the item transverse to the cross beam assembly;

executing, by at least one processor, an automated sequence for generating calibration image data, wherein the automated sequence comprises controlling the transfer assembly to reposition the calibration target assembly to each of predetermined three-dimensional (3D) poses of the calibration target assembly relative to a stereo vision assembly and controlling the stereo vision assembly to image the optical calibration targets in each of the predetermined 3D poses to generate the calibration image data; wherein the stereo vision assembly is detachably mounted to the cross beam assembly and comprises a left camera and a right camera to image the calibration target assembly in each of the predetermined 3D poses to generate the calibration image data, wherein the left camera is configured for imaging a first subset of the optical calibration targets to generate left camera image data, wherein the right camera is configured for imaging a second subset of the optical calibration targets to generate right camera image data; and wherein the calibration image data comprises the left camera image data and the right camera image data;

processing, by the at least one processor, the calibration image data to generate calibration data for controlling operation of the robotic transfer apparatus based on image data generated by the stereo vision assembly; and controlling, by the at least one processor based on the calibration data, the transfer assembly to transfer the item from the first location to the second location.

14. The method of claim 13, wherein:

the first subset of the optical calibration targets comprises at least one checkerboard calibration pattern;

the second subset of the optical calibration targets comprises at least one checkerboard calibration pattern;

the left camera image data is generated via imaging of the at least one checkerboard calibration pattern of the first subset of the optical calibration targets; and the right camera image data is generated via imaging of the at least one checkerboard calibration pattern of the second subset of the optical calibration targets.

15. The method of claim 14, wherein:

the stereo vision assembly further comprises a left laser and a right laser, the left laser is configured for emitting a left laser light pattern; and the right laser is configured for emitting a right laser light pattern.

16. The method of claim 15, wherein:

the first subset of the optical calibration targets comprises at least one checkerboard calibration pattern;

the second subset of the optical calibration targets comprises at least one checkerboard calibration pattern;

the left camera image data is generated via imaging of incidence of the left laser light pattern on the first subset of the optical calibration targets; and the right camera image data is generated via imaging of incidence of the right laser light pattern on the second subset of the optical calibration targets.

17. The method of claim 13, wherein:

the transfer assembly comprises one or more transfer assembly alignment members; and the calibration target assembly comprises one or more calibration target assembly alignment features configured to interface with the one or more transfer assembly alignment members to control orientation of the calibration target assembly relative to the transfer assembly.

18. The method of claim 13, wherein the transfer assembly is configured for repositioning the calibration target assembly transverse to the cross beam assembly to place the optical calibration targets into a field of view of the stereo vision assembly.

* * * * *